May 4, 1965  H. B. TAYLOR  3,181,580
COLLET TYPE FINDERS FOR USE WITH POWER SCREW DRIVERS
Filed July 26, 1962  2 Sheets-Sheet 1

INVENTOR
HUGH B. TAYLOR
BY
ATTORNEY

May 4, 1965  H. B. TAYLOR  3,181,580
COLLET TYPE FINDERS FOR USE WITH POWER SCREW DRIVERS
Filed July 26, 1962  2 Sheets-Sheet 2

INVENTOR
HUGH B. TAYLOR
BY
ATTORNEY

United States Patent Office 3,181,580
Patented May 4, 1965

3,181,580
COLLET TYPE FINDERS FOR USE WITH
POWER SCREW DRIVERS
Hugh B. Taylor, Waverly, N.Y., assignor to Ingersoll-Rand Company, New York, N.Y., a corporation of New Jersey
Filed July 26, 1962, Ser. No. 212,699
2 Claims. (Cl. 145—52)

This invention relates to a finder attachment for power driven screw driving tools and more particularly to a collet finder for power screw drivers.

Heretofore it has been known that to facilitate the locating and installation of a screw, a finder was attached to the front portion of a screw driver. This finder may have been the type with a cup end for locating the screw driver over the head of the screw or it may have been of the collet type to provide for picking up the screw by the screw driver prior to insertion in the tapped hole. The collet type was usually made of steel and the head of the screw was attached to the collet by means of the force generated by the head of the screw pressing up against the walls of the collet. Since this retaining friction was not too secure, any sort of jar knocked the screw out of the collet. In addition, care had to be taken (when the screw was inserted in the collet) to prevent the bit of the screw driver from coming down and hitting the top of the screw, and thus knocking the screw out from the collet. The finder spring was required to be of sufficient stiff strength to hold the bit of the screw driver back in place, while the operator pushed down on the screw driver with sufficient axial force to deflect the stiff collet fingers sufficiently to allow the screw head to enter the collet finder. However, when the operator was ready to insert the screw in the work, in order to bring the bit of the screw driver down to engage the head of the screw, he had to exert sufficient force to overcome the stiffness of the finder spring. The force required to depress the finder spring was objectionable from the standpoint of operator fatigue.

In addition, in order to provide a biasing or supporting means for the collet fingers, and to facilitate the entry of the screw head, the diameter of the collet was excessively large. This large diameter collet obstructed the vision of the operator and made it difficult for the operator to see the end of a small screw on the collet in order to locate it in the correct position on the work. This resulted in the waste of work time.

Further, the collet finders with steel fingers made as part of the finder body, were objectionable because they were subject to permanent damage if a screw tipped over when the driving operation was started. A screw that was tipped would cause deflection of the stiff fingers sufficiently to cause a permanent bend.

In addition, in the previous design of collet finders, the retention of the screw after pick-up was dependent upon the force exerted by the collet fingers and/or by the friction between the collet surface and the head of the screw. Some prior designs had notched collet fingers to assist in the retention of the screw. However, the force exerted by the collet fingers was still the primary means of retention. This retention force was not positive enough to assure the retention of the screw at all times. After constant use, the collet fingers became worn and/or their resilient characteristics were lost through fatigue. This resulted in the screw retention force decreasing to a point where the picking up and retaining of the screw became a hit and miss proposition which resulted in the loss of work output.

U.S. Patent No. 2,684,698 issued to E. H. Shaff recites a collet type finder of the type hereinbefore discussed which has fingers as part and integral with the collet. This invention utilizes the spring force of the collet fingers and friction to keep the screw in place in the collet.

U.S. Patent No. 2,625,967 issued to J. S. Stull on January 20, 1953, recites a standard type collet device having a series of fingers at the end of the collet for picking up screws. This device discloses resilient collet fingers which are held in retaining position by a longitudinally shiftable sleeve or collar precluding spreading of said collet although exerting substantially no clamping force on said collet fingers. This device although an improvement on the standard stiff type of collets hereinbefore discussed, still does not by any means eliminate the difficulties hereinbefore enumerated.

U.S. Patent No. 2,658,538 issued to D. M. Kitterman on November 10, 1953, recites a collet type pick-up device. In this device the collet ends have a hook type shape in order to positively retain the screw head. However, this device would seem to be not only, difficult to operate, but because of the number of stiff parts to be contended with, the operation of this device would increase operator fatigue because the force exerted by the biasing parts must be overcome.

U.S. Patent No. 2,893,455 issued to F. L. Lindberg, discloses an effort by the inventor to set forth a means of positively holding the head of the screw and at the same time as the screw is inserted in the work to facilitate the removing of the screw holder. The invention recites loops at the end of the holding device which hold the screw head. Here, however, the insertion of the screw in the holding device is a complicated operation because a back portion of the device has to be moved downward by the operator until the inturned corner portions of the device engage with a shoulder in order to put the loops in a position to receive the head of the screw. Once the screw is inserted the back portion is slid backwards causing the loops to engage the screw and make it ready for the screwing operation. As the screw is driven in the work the loops are pushed up against the work and in so doing they spread apart thus releasing the screw. The force required to spread the loops apart is considerable, thus resulting in operator fatigue.

Also this holder cannot be adapted to be used with all types of screw heads as, for example, a fillister head screw. The fingers are also limited to the size of heads they can pick up, one set of fingers could not be made adaptable to pick up all sizes of heads. Further there is no way provided for preventing the screw from bending out of alignment, and if the screw slips and bends it can inflict a permanent bend on a loop and thus make the whole device useless.

It is the general object of the present invention to avoid and overcome the foregoing and other difficulties of and objections to prior art practices by the provision of improved collet type finders for use with power screw drivers which will require a small force to facilitate entry of a screw head into the finder and at the same time be of sufficient stiffness to retain the screw securely.

Another object of the present invention is to provide collet type finders which release the screw as the driving is completed.

Still another object of the present invention is to provide a collet type finder for use with power tools which will facilitate the operator's ability to clearly see the end of a small screw and therefore be able to locate it in a correct position to be driven without any difficulty.

Yet another object of the present invention is to provide a collet type finder requiring a minimum amount of axial force be exerted by the operator in order to allow a screw head to enter and be received by the collet finder, thereby eliminating the use of a heavy finder spring and thus, to a great extent, operator fatigue.

A further object of the present invention is to provide a collet finder which would be more easily adaptable to be used with different size and types of screw heads and also provide easier replacement of worn collet fingers.

A still further object of the present invention is to provide a collet finder which positively retains the screw.

The aforesaid objects of the present invention, and other objects which will become apparent as the description proceeds, are achieved by providing a collet finder adapted to hold the head of a screw and for use with a power screw driver having a bit. The improved collet finder has a support means reciprocally disposed on the housing to support compression load, and a biasing means disposed in the support means to exert force on the support means. A first guide means is disposed on the housing and on the support means to guide the support means. The support means is provided with a second guide means to guide the bit. A first retaining means is disposed on the support means to hold the screw head. In addition a second retaining means is disposed on the support means to secure the first retaining means to the support means.

For a better understanding of the present invention reference should be had to the accompanying drawings, wherein like numerals of reference indicate similar parts throughout the several views and wherein.

Although the principles of the present invention are broadly applicable to screw holders for screw drivers, the present invention is particularly adapted for use in conjunction with collet finders for power screw drivers and hence it has been so illustrated and will be so described.

Figure 1:
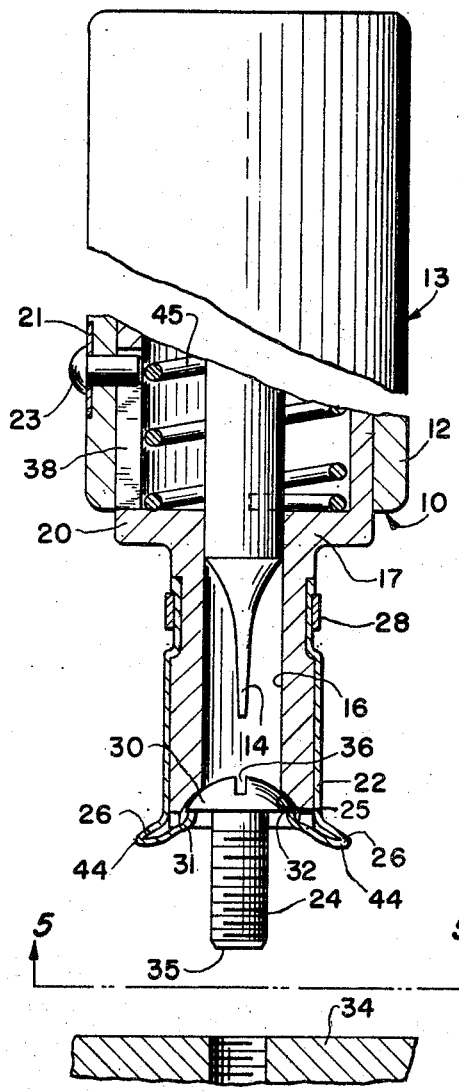
FIGURE 1 is a side elevational view of a collet finder partly in section showing a screw in position in the collet finder.
Figure 4:
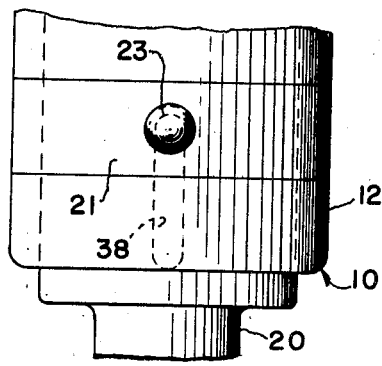
FIGURE 4 is a fragmentary side elevational view of the collet finder as seen from the left side of FIGURE 1 showing in detail a riveted pin and a spring loaded band which serve as a retainer and guide for the collet body.

With specific reference to the form of the present invention illustrated in the drawings and referring particularly to FIGURE 1 a collet finder assembly is indicated generally by the reference numeral 10. The collet finder assembly 10 has a housing, such as a clutch housing 12 (FIGURE 1) adapted for attaching by any well known manner, such as by screws, to a standard power screw driver 13. To support a compression load, a support means, such as a collet body 20 (FIGURE 1), is slidably disposed in part within the clutch housing 12. This collet body 20 is slidably secured to the clutch housing 12 by means of a spring loaded band 21 and a riveted pin 23 (FIGURE 1 and FIGURE 4).

Figure 2:
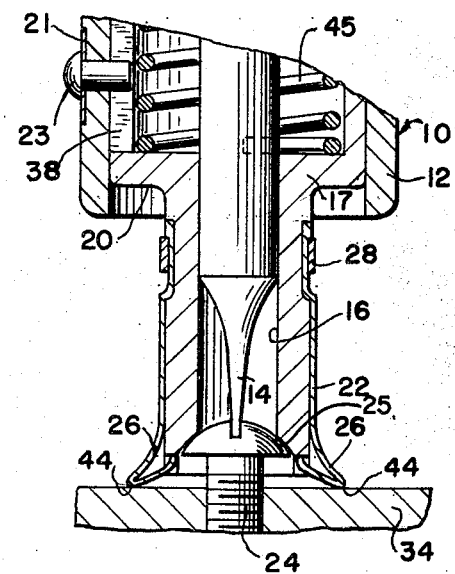
FIGURE 2 is a fragmentary side elevational view, partly in section, of the collet finder shown in FIGURE 1 showing the position of the collet fingers when the screw is partially driven in the work.
Figure 3:
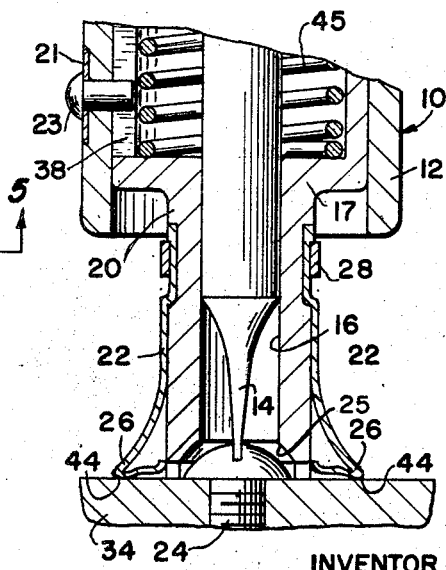
FIGURE 3 is an elevational view similar to FIGURE 2, partly in section, of the collet finder showing the position of the collet fingers when the screw is completely driven in the work and the screw is released.
Figure 5:
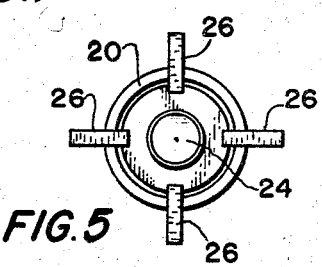
FIGURE 5 is an end view as viewed from the front end of a collet finder along the line 5—5 of FIGURE 1 showing the end position of the collet fingers.

In order to guide a bit 14 of the screw driver 13, a second guide means, such as a bore 16 (FIGURE 1) is provided within the collet body 20. The bore 16 extends from a head end 17 of the collet body 20 to a finger end 22 and is adapted to receive the bit 14 of the screw driver 13. As shown in FIGURES 1, 2, and 3, the finger end 22 of the collet body 20 is centrally rounded to provide a cradle 25. For the purpose of allowing the bit 14 to move from its rest position, as shown in FIGURE 1, where the bit 14 is located in the middle of the collet body 20, to the finger end 22 of the collet body 20, the collet body 20 is slidably reciprocably disposed within the clutch housing 12 (FIGURE 1). This collet body 20 is made of hard material in order to enable it to withstand the compression load required for the screwing operation. For the purpose of picking up and retaining a screw 24 to the collet assembly 10, a first retaining means, such as a set of collet fingers 26 (FIGURE 1), are secured to the collet body 20 by a second retaining means, such as a spring band 28 (FIGURE 1).

The collet fingers 26 are hook shaped (as shown in FIGURE 1) at their hooked ends 31 so as to hook underneath the head 30 of the screw 24 at a point 32 (FIGURE 1) thus constituting a gripping means to positively retain the screw 24 in position at the finger end 22 of the collet body 20 against the cradle 25 as shown in FIG. 1. The collet fingers 26 are made of resilient material such as spring steel, so that they can be spread out very easily by the operator pushing down on the collet assembly 10 after the collet fingers 26 are placed against the head 30 of the screw 24. It can be seen that as the screw 24 is moved beyond the hooked ends 31 of the collet fingers 26, the collet fingers 26 snap back underneath the head 30 of the screw 24 and positively hold the screw 24 in place (FIGURE 1) against the cradle 25.

Because the collet fingers 26 are resilient, a small amount of pressure by the operator is required to spread the collet fingers 26 apart in order to receive the head 30 of the screw 24, thus saving a great deal of operator fatigue. It can further be seen that by making the hooked ends 31 of the collet fingers 26 hooked, the screw 24 can be positively held in place by the hooked ends 31 thus holding the head 30 against the collet body 20 as shown in FIGURE 1. In addition, since the collet fingers 26 are separately mounted on the collet body 20 they can be readily replaced individually. This type of mounting not only cuts repair and replacement costs but it also cuts to an absolute minimum the time that the collet finder assembly 10 will be out of useful service.

Once the screw 24 is securely in place on the collet finder assembly 10 then the operator places the screw 24 over a work piece 34 (FIGURE 1). It can be seen that since the collet fingers 26 are thin and have a small outside diameter, the operator will be able to see the end 35 of the screw 24 (FIGURE 1) more easily and thus facilitate the location of the screw 24 in the work piece 34. As the screw is brought into contact with the work piece 34 and the operator presses down on the screw driver 13, the bit 14 is guided toward a guide notch 36 on the head 30 of the screw 24, by the bore 16 of the collet body 20. Thus it can be seen that the bit 14 is very easily located in the guide notch 36.

As the operator begins to drive the screw in the work piece 34, the collet body 20 begins to slide up in the clutch housing 12, from the position shown in FIGURE 1 to the position shown in FIGURE 2, thus allowing the bit 14 to reach further and further down into the collet body 20. In order to properly guide the collet body 20 into the clutch housing 12 a first guide means, such as a slot 38 (FIGURES 1 and 4) in the clutch housing 12, and the riveted pin 23, disposed in the slot 38, are provided as shown in FIGURE 4. It can easily be seen that the vertical reciprocating motion of the collet body 20 will be guided by the dimensional characteristics of the slot 38 and the riveted pin 23.

As the screw 24 is driven further into the work piece 34, release means such as the end points 44 of the collet fingers 26 will come into contact with, and be diverted by the work piece 34 as shown in FIGURE 2. As the screw 24 is further driven into the work piece 34, from the position shown in FIGURE 2 to the position shown in FIGURE 3, the end points 44 will be spread further and further apart until, as shown in FIGURE 3, the screw 24 is fully driven into the work piece 34. When the screw 24 is fully driven into the work piece 34 the fingers 26 will have been fully spread apart away from the head 30 of the screw 24 and in so doing will have fully released the screw 24. Thus it can be seen that when the screw 24 is fully driven in the work piece 34 it will be easily released by the collet finder assembly 10.

In order for the collet body 20 to slide out and move back to its starting position (FIGURE 1) thus preparing such collet body 20 to pick up another screw 24, a biasing means, such as a spring 45 (FIGURE 1), is disposed inside the collet body 20. During the screwing operation as the collet body 20 slides into the clutch housing 12 it compresses the spring 45. When the screwing operation is completed and the screw driver 13 is lifted up away from the work piece 34, the pressure compressing the spring 45 is removed and the spring 45 will expand to its normal length thereby moving the collet body 20 to its normal starting position as shown in FIGURE 1.

*Operation*

Even though it is believed that the operation of the apparatus will be apparent from the foregoing description, a brief review of such operation will now be made for purposes of summary and simplification. The screw driver 13 carrying the collet finder assembly 10 is disposed adjacent a standard screw holding tray (not shown) and the power screw driver 13 and collet finder assembly 10 are placed above a screw 24 in the tray (not shown). The operator presses the collet finder assembly 10 down on the screw 24. The collet fingers 26 at the end of the collet body 20 being of spring material will spread out and receive the head 30 of the screw 24. When the screw 24 is received, the hooked ends 31 of the collet fingers 26 will spring back toward the head of the screw 24 because they are made of spring-like material and are flexible. The hooked ends 31 of the collet fingers 26 are also especially shaped in order to grip underneath the head 30 of the screw 24 as shown in FIGURE 1 at point 32 and therefore positively retain the screw 24 against the collet body 20.

The screw 24 is then brought over to the work piece 34 as shown in FIGURE 1. It can be seen that since the collet body 20 has a small outside diameter at its finger end 22, the operator will be able to see the ends 35 of the shorter screws 24 thus facilitating the quick location of the screws 24 on the work piece 34.

When the screw 24 is located above the work piece 34, the operator pushes down on the screw driver 13, and as he does so, the bit 14 is guided by the bore 16 of the collet body 20 towards the guide notch 36 on the head 30 of the screw 24. Once the bit 14 is positioned in the notch 36, the screw 24 can be driven into the work piece 34. As the screw 24 is driven into the work piece 34 the collet body 20 slides back (from the position shown in FIGURE 1 to the position shown in FIGURE 2) into the clutch housing 12, thus compressing the spring 45 (FIGURE 2). In addition, as the screw 24 is driven in the work piece 34 the end points 44 of the collet fingers 26 butt up against the work piece 34 and are deflected outwardly as shown in FIGURE 2. When the screw 24 is fully driven inside the work piece 34 (as shown in FIGURE 3) the end points 44 of the collet fingers 26 have completely spread out thus releasing the screw 24 as shown in FIGURE 3. As the operator lifts up the screw driver 13, the pressure on the spring 45 is released, thereby causing the spring 45 to move the collet body 20 to its starting position (FIGURE 1).

*Alternative embodiments*

Figure 7:
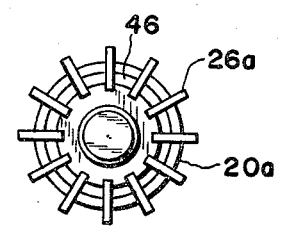
FIGURE 7 is an end view (similar to FIGURE 5) of a further alternative embodiment of the collet finder showing a number of collet fingers with splits or spaces in between the fingers.

It will be understood by those skilled in the art that alternatively any number of collet fingers 26a can be used, as shown in FIGURE 7, where the finger end of a collet body 20a is composed of fingers 26a being separated by spaces 46.

Alternatively any number of fingers 26a can be used depending upon the operating conditions, such as the type and size of the screw, the type of work, etc.

Figure 6:
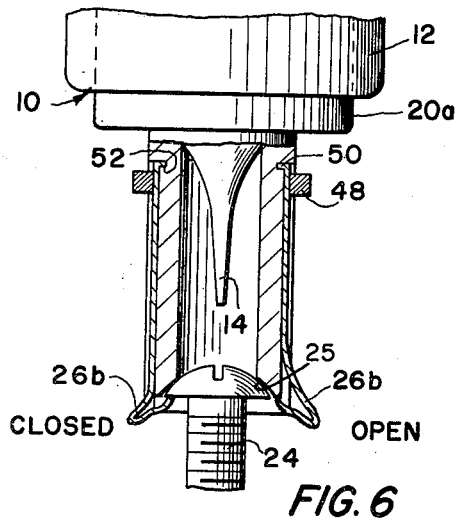
FIGURE 6 is a fragmentary side elevational view partly in section of an alternative embodiment of the collet finder showing an alternative form of the legs on the collet body.

In addition, alternatively the fingers 26b can be secured to the collet body 20 as shown in FIGURE 6 by the use of a retaining ring 48. In this alternative embodiment the collet body end 50 of the fingers 26b is bent to securely hook into the collet body 20 at point 52 as shown in FIGURE 6.

It will be recognized by those skilled in the art that the objects of the present invention have been achieved by providing a collet finder assembly which can receive a screw simply and without requiring a great deal of fatigue on the part of the operator. When the screw is received by the collet finder assembly, such screw is positively held and is easily released at the end of the screwing operation. In addition the collet finder assembly cannot be damaged by the screw turning over because the screw is positive held tight in place. In addition, since the screw is easily received, the employment of a strong collet spring is not necessary to hold the bit back in order not to push out the screw when the collet finder assembly is pushed up against the head of the screw to receive the screw thereby eliminating a great amount of operator fatigue. Further the pickup means of the collet finder can be easily and cheaply replaced.

While in accordance with the patent statutes a preferred embodiment of the present invention has been illustrated and described in detail, it is to be particularly understood that the invention is not limited thereto or thereby.

I claim:

1. In a tool for setting in a base a threaded fastening element of the class wherein a bit sets said threaded fastening element in said base, a collet body disposed around said bit to support compression load, the combination with said collet body:
    (a) a cradle disposed on said collet body; and
    (b) fingers disposed on said collet body extending in part around said cradle to receive said threaded fastening element;
    (c) said fingers being provided with hooked ends to hook underneath a portion of said threaded fastening element to positively hold said threaded fastening element against said cradle.

2. In a tool for setting in a base a threaded fastening element of the class wherein a bit sets said threaded fastening element in said base, a collet body disposed around said bit to support compression load, the combination with said collet body:
    (a) a cradle disposed on said collet body; and
    (b) fingers disposed on said collet body extending in part around said cradle to receive said threaded fastening element;
    (c) said fingers being provided with hooked ends to hook underneath a portion of said threaded fastening element to positively hold said threaded fastening element against said cradle;
    (d) said fingers being provided with points to contact said base and be diverted by said base as said threaded fastening element is set in said base to remove said hooked ends away from said threaded fastening element to release said threaded fastening element.

References Cited by the Examiner

UNITED STATES PATENTS

| | | | |
|---|---|---|---|
| 1,698,521 | 1/29 | Wood | 145—51 |
| 2,684,698 | 7/54 | Shaff | 145—52 |
| 2,886,075 | 5/59 | Skoog | 144—32 |

FOREIGN PATENTS 511,604   4/55   Canada.

WILLIAM FELDMAN, *Primary Examiner.*